Patented Jan. 9, 1951

2,537,446

UNITED STATES PATENT OFFICE 2,537,446

FUSED CYCLIC THIOPHENES

Lawrence W. Devaney, Waco, Tex., assignor to The Texas Company, New York, N. Y., a corporation of Delaware No Drawing. Application April 23, 1948, Serial No. 22,949

12 Claims. (Cl. 260—330)

This invention relates to a process for the production of heterocyclic sulfur compounds; the invention is particularly concerned with the preparation of fused cyclic derivatives of thiophene in which a cyclic nucleus and a thiophene nucleus share two carbon atoms.

Heterocyclic sulfur compounds such as those containing a thiophene nucleus have, in the past, been primarily of academic interest due to the uneconomical and difficult methods required for the preparation thereof. I have discovered that fused cyclic derivatives of thiophene can also be prepared by the reaction of an alkyl cyclic compound with sulfur at an elevated temperature.

The process of this invention broadly involves the vapor phase reaction of a cyclic compound containing an aliphatic substituent which consists of at least two carbon atoms with sulphur at an elevated temperature of at least 800° F. The reaction between a cyclic compound containing an alkyl group of at least two carbon atoms and sulphur is effected either in the presence or absence of a catalyst. However, improved results are obtained if a solid contact material is employed as a catalyst in the reaction. In the preferred embodiment of the invention, cyclic compounds containing an alkyl group of at least two carbon atoms are reacted with sulfur in the vapor phase at an elevated temperature of at least 900° F. and in the presence of dehydrogenation type catalysts.

The invention is particularly adaptable to the preparation of fused aryl derivatives of thiophene, such as thianaphthene (also called benzothiophene), wherein two carbon atoms are shared by the respective aryl and thiophene nuclei. In this preferred modification the organic charge stock comprises alkyl-substituted aryl compounds wherein the alkyl group contains at least two carbon atoms; ethylbenzene, styrene, cumene and para-cymene are typical examples of alkylated aryl compounds which form a preferred charge stock in the method of this invention. The process of this invention is illustrated by the following equation wherein styrene and sulfur are reacted to form thianaphthene:

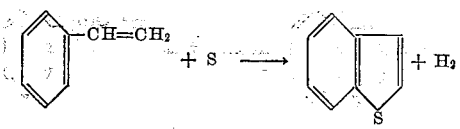

In general, cyclic compounds containing an alkyl group which consists of at least 2 carbon atoms may be employed as the organic charge stock. The type of cyclic derivative of thiophene produced in the reaction depends to a large extent on the choice of charge stock used in the reaction. Alkyl-substituted heterocyclics such as 3-ethylthiophene and 3-ethylpyridine may be used as the alkylated cyclic charge material. As has been indicated in the previous paragraph, the preferred charge material comprises alkyl aromatics in which the alkyl group contains at least two carbon atoms; fused aryl thiophene derivatives result from the employment of alkylated aromatics as the charge stock in the method of this invention. Alkylated hydroaromatics such as ethyl cyclohexene may also be used. There appears to be no limit on the chain length of the alkyl group in the alkyl-substituted cyclic compounds employed in the process of the invention with the exception that the hydrocarbons should be in vapor form under reaction conditions. However, when simple products of reaction are desired, it is advisable to employ a charge stock containing an alkyl-substituted compound in which the alkyl group contains between 2 and 8 carbon atoms.

The process also includes the use of substituted alkylated cyclic hydrocarbons as the charge stock. There may be employed substituted alkylated cyclic hydrocarbons in which the substituents either remain attached to the hydrocarbons during the reaction or are removed during the reaction to form compounds which do not have a substantially adverse effect on the reaction. The substituents may be either attached to the cyclic nucleus or to the alkyl group in the substituted alkyl cyclic compounds employable as the charge material. Examples of such substituted alkylated cyclic hydrocarbon compounds are halogen derivatives such as parachloroethylbenzene and hydroxy derivatives such as phenylethyl alcohol. In substituted cyclic compounds containing an alkyl group consisting of at least two carbon atoms, the main requirement is that a carbon atom of the alkyl group in beta position to the benzene ring contain at least 1 hydrogen atom attached thereto or a readily replaceable group or atom such as a hydroxyl, chlorine or bromine.

Sulfur compounds such as ammonium polysulfide, which decompose to form sulfur at temperatures below reaction temperature, may be used as the sulfur-containing reactant in the process of this invention. The sulfur may be separately vaporized prior to introduction into the reaction zone or a mixture of organic charge stock and sulfur may be heated to approximately reaction temperature and then introduced into the reaction zone.

As has been indicated previously, the process of the present invention wherein sulfur is reacted with an alkylated cyclic compound to form a fused cyclic thiophene derivative does not require the presence of a solid contact material in order to obtain substantial yield of product. Thus, a fused cyclic thiophene derivative is obtained by passing a mixture of sulfur and an alkylated cyclic compound in which the alkyl group contains at least 2 carbon atoms at prescribed space velocity and mol ratio of reactants through an empty tube maintained within the prescribed temperature range.

It is advisable, however, in order to obtain the optimum yields of fused cyclic derivatives of thiophene per unit of alkylated cyclic compound charged to the reactor to employ a catalytic material in the reaction zone. Accordingly, the heterocyclization reaction of the invention is preferably conducted in the presence of a solid contact catalyst which may be described chemically as a solid contact material of the class consisting of oxides and sulfides which are stable under reaction conditions. Such catalysts include metal oxides such as molybdena which, under the conditions of reaction may undergo conversion to the corresponding sulfide. It is recognized that certain of the materials classified as catalytic for the subject reaction are inert as applied to conventional reactions. Selection of the particular catalyst to be used depends to a large extent upon the choice of charge stock used in the reaction. The solid contact catalysts usually preferred for application with alkylated aromatic charge stock are the solid acid-reacting materials such as amphoteric metal oxide and sulfides which are stable under reaction conditions such as alumina, silica, etc.

Specific examples of catalysts which may be used in the conversion are oxides of aluminum, chromium, vanadium, molybdenum, titanium, magnesium, boron, silicon and sulfides of iron, nickel, cobalt, tungsten, tin, etc., as well as mixtures and chemical combinations thereof, such as silica-alumina, acid-treated bentonitic clays, etc.

The familiar class of dehydrogenation catalysts is included within the general classification of solid acid-reacting contact catalysts and represents preferred catalysts for the process of this invention. Suitable dehydrogenation catalysts are the oxides and stable sulfides of the metals of Group VI of the periodic table. Specially preferred dehydrogenation catalysts are chromia-alumina, molybdena-alumina and molybdenum-sulfide-alumina. Silica-stabilized alumina is a particularly preferred supporting material for metal oxides and sulfides; catalysts containing silica-stabilized alumina as a supporting material for metal oxides and sulfides are readily regenerated to a high level of activity and, therefore, are particularly useful in commercial operation of the present process.

In carrying out the process of this invention, the reactants in vapor form are introduced into a reaction chamber which is maintained at desired reaction temperature and which preferably contains a solid contact catalyst. Of course, as has been indicated previously, the reaction zone may be entirely free of solid contact material.

It is evident that if a catalyst is employed in the vapor phase reaction between sulfur and an alkylated cyclic compound, the process may be effected in accordance with any of the usual techniques for high temperature catalytic conversions. Thus, fixed catalyst beds may be used in alternate reaction and regeneration cycles; fluid catalyst operation may be used wherein catalyst is continuously withdrawn from a reaction zone, regenerated and reintroduced into the reaction zone after regeneration; fluidized fixed bed operation may also be employed wherein the catalyst particles remain in the reaction zone during alternate reaction and regeneration cycles; stirred catalyst beds as well as moving catalyst beds of the Thermofor type are other possible alternatives.

It will be recognized that particular conditions of reaction will vary with the reactant and also with whether a catalytic or non-catalytic process is employed; the type of process technique will also affect the selection of the particular reaction conditions. As a general proposition, however, a temperature of at least 900° F., a space velocity of about 0.1 to 10, wherein space velocity defines the weight of hydrocarbon per hour per weight of catalyst, and a mol ratio of sulfur to hydrocarbon within the range of 0.5 to 10 are preferred in the majority of reactions.

Particular conditions of reaction are best illustrated by reference to conditions employed in the reaction of an alkyl aromatic hydrocarbon such as styrene over a pelleted silica-chromia-alumina catalyst employing a fixed bed type of process technique. In charging sulfur and styrene over a silica-chromia-alumina catalyst, the space velocity advantageously falls within the range of 0.5 to 4.0; the mol ratio of sulfur to styrene preferably lies within the range of 1.0 to 5.0; the temperature in the catalyst zone is maintained between 900 and 1500° F. and preferably between 1100 and 1300° F. It is to be understood that the specific conditions described as optimum are those which result in optimum yields of thianaphthene (benzothiophene) in a single pass operation. Where a continuous recycle process is used, it may be desirable to modify these preferred conditions of reaction in order to obtain an optimum ultimate yield of the desired production.

If a catalyst is employed, the process period for optimum production of fused cyclic thiophene derivatives will depend to some extent upon the charge stock and reaction conditions employed but generally will be about one hour in duration. Periodic determination of the yield of fused cyclic thiophene derivatives will indicate practical period of catalytic use without regeneration. When the yield of fused cyclic thiophene derivative is found to fall off sharply, the catalyst may be regenerated by conventional methods such as regeneration by air at about 1,000° F., which methods are typical of the type of catalyst technique employed.

Fused cyclic thiophene compounds produced by the reaction may be recovered from the reaction product in accordance with conventional methods of recovery, for example, the reaction product obtained by the heterocyclization of styrene to thianaphthene containing unreacted organic compound, unreacted sulfur, cracked products of charge stock and hydrogen sulfide may be passed through a caustic soda solution to dissolve the acid gases. If the caustic soda solution is maintained cold, thianaphthene will condense as a supernatant layer which can be drawn off therefrom and distilled to yield thianaphthene. If the caustic soda solution is maintained hot, thianaphthene will steam distill therefrom and can then be separated from the water portion of the distillate and thereafter purified by distillation.

The fused cyclic thiophene products of reaction may also be recovered in crude form by a simple condensation procedure using steam-cooled condensers followed by water-cooled condensers; the reaction product may also be passed into a cool body of hydrocarbon oil such as Diesel fuel or furnace oil which has an initial boiling point about 450° F.; the fused cyclic thiophene compounds condense in the hydrocarbon oil and can later be recovered from the condensing oil by distillation.

The process of the invention may be further illustrated by the following specific example.

Styrene and sulfur in a mol ratio of about 4.4 mols of sulfur per mol of styrene were mixed, preheated to approximately reaction temperature and charged to a catalytic fixed bed reaction chamber maintained at 1235° F. and atmospheric pressure. The reaction chamber contained a pelleted catalyst which consisted of a mixture of chromic oxide, silica and alumina having the approximate composition of 10 per cent $Cr_2O_3$, 5 per cent $SiO_2$ and 85 per cent $Al_2O_3$. The reactants were charged at a hydrocarbon space velocity of approximately 1.6 weights of styrene per hour per weight of catalyst. The catalyst was maintained on stream for a period of about 32 minutes without reactivation. Thianaphthene of about 95 per cent purity was obtained in a yield of about 4.2 pounds per 100 pounds of styrene charged.

Ethylbenzene, cumene and para-cymene also react with sulfur under the conditions of reaction to produce thianaphthene derivatives. Thianaphthene is produced by the reaction of ethylbenzene and sulfur; a mixture of thianaphthene and 3-methylthianaphthene are produced by the reaction of cumene and sulfur; a mixture of thianaphthene, 3-methylthianaphthene and 3,6-dimethylthianaphthene are obtained by the reaction of paracymene with sulfur.

It will be understood, of course, that this example is merely illustrative of the preferred embodiment of the invention and that other catalyst charge stocks may be employed in the process of the invention. By using other selected alkyl cyclic compounds, fused cyclic thiophene derivatives containing various substituents may be produced by the reaction of sulfur with a cyclic compound containing an alkyl side chain of at least two carbon atoms. Alkyl derivatives of naphthenes or alkyl derivatives of heterocyclics wherein the alkyl groups contain two or more carbon atoms may be employed to prepare a variety of compounds containing a thiophene nucleus.

Obviously many modifications and variations of the invention, as hereinbefore set forth, may be made without departing from the spirit and scope thereof and, therefore, only such limitations should be imposed as are indicated in the appended claims.

I claim:

1. A process for preparing fused carbocyclic derivatives of thiophene which comprises reacting sulfur with a carbocyclic compound containing an aliphatic side chain of at least two carbon atoms and a hydrogen atom on the nuclear carbon atom adjacent to the aliphatic chain in the vapor phase at an elevated temperature between 800 and 1500° F.

2. A process for preparing fused aryl derivatives of thiophene which comprises reacting sulfur with an aryl compound containing an alkyl side chain of at least two carbon atoms and a hydrogen atom on the nuclear carbon atom adjacent to the alkyl chain in the vapor phase at an elevated temperature between 800 and 1500° F.

3. A process for preparing fused carbocyclic derivatives of thiophene which comprises reacting sulfur with a carbocyclic compound containing an alkyl side chain of at least two carbon atoms and a hydrogen atom on the nuclear carbon atom adjacent to the alkyl side chain in the presence of a solid contact catalyst in the vapor phase at an elevated temperature between 800 and 1500° F.

4. A process according to claim 3 in which a solid contact catalyst is a dehydrogenation catalyst.

5. A process according to claim 3 in which a solid contact catalyst comprises a surface-active material and a compound selected from the class consisting of Group VI metal oxides and sulfides.

6. A process for preparing fused aryl derivatives of thiophene which comprises reacting in the vapor phase sulfur with an aryl compound containing an alkyl side chain of at least two carbon atoms and a hydrogen atom on the nuclear carbon atom adjacent to the alkyl side chain in the presence of a solid contact catalyst at an elevated temperature between 800 and 1500° F.

7. A process according to claim 6 in which the solid contact catalyst is a dehydrogenation catalyst.

8. A process according to claim 6 in which the solid contact catalyst comprises a surface-active material and a compound selected from the class consisting of Group VI metal oxides and sulfides.

9. A process for the production of thianaphthene which comprises reacting sulfur with a compound selected from the group consisting of ethylbenzene and styrene in the presence of a solid contact catalyst in the vapor phase at an elevated temperature between 800 and 1500° F.

10. A process according to claim 9 in which the solid contact catalyst comprises a surface-active material and a compound selected from the group consisting of the oxides and sulfides of Group VI metals.

11. A process according to claim 9 in which the solid contact catalyst is chromia supported on silica-stabilized alumina.

12. A process according to claim 9 in which the temperature is maintained between 1050 and 1250° F.

LAWRENCE W. DEVANEY.

REFERENCES CITED

The following references are of record in the file of this patent:

UNITED STATES PATENTS

| Number | Name | Date |
|--------|------|------|
| 1,887,156 | Hessle | Nov. 8, 1932 |
| 1,907,274 | Wheeler | May 2, 1933 |
| 1,996,334 | Hessle | Apr. 2, 1935 |
| 2,168,840 | Groll | Aug. 8, 1939 |
| 2,410,401 | Coffman | Oct. 29, 1946 |
| 2,478,914 | Greensfelder | Aug. 16, 1949 |

OTHER REFERENCES

Moore et al., J. Am. Chem. Soc. 69, 2008–2009 (1947).